United States Patent
Chen et al.

(10) Patent No.: US 7,749,472 B2
(45) Date of Patent: Jul. 6, 2010

(54) PHOSGARD, A NEW WAY TO IMPROVE POISON RESISTANCE IN THREE-WAY CATALYST APPLICATIONS

(75) Inventors: Shau-Lin Franklin Chen, Piscataway, NJ (US); Knut Wassermann, Princeton, NJ (US); Jin Sakakibara, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 619 days.

(21) Appl. No.: 11/504,247

(22) Filed: Aug. 14, 2006

(65) Prior Publication Data

US 2008/0038172 A1 Feb. 14, 2008

(51) Int. Cl.
*B01J 23/00* (2006.01)
*B01J 8/02* (2006.01)
*B01D 53/56* (2006.01)
*B01D 53/94* (2006.01)
*C01B 21/00* (2006.01)
*C01B 23/00* (2006.01)
*C01B 25/00* (2006.01)
*C01B 31/00* (2006.01)
*C01B 33/00* (2006.01)
*C01B 35/00* (2006.01)
*C01G 28/00* (2006.01)
*C01G 30/00* (2006.01)

(52) U.S. Cl. .......... 423/213.2; 423/213.5; 502/302; 502/303; 502/326; 502/327; 502/332; 502/333; 502/334; 502/339; 502/355; 502/415; 502/439; 502/527.12; 502/527.13; 502/527.19

(58) Field of Classification Search .......... 502/302, 502/303, 326, 327, 332, 333, 334, 339, 355, 502/415, 439, 527.12, 527.13, 527.19, 261, 502/262; 423/213.2, 213.5
See application file for complete search history.

(56) References Cited

U.S. PATENT DOCUMENTS 4,134,733 A  1/1979  Völker et al.

(Continued)

FOREIGN PATENT DOCUMENTS

EP  0439010  7/1991

(Continued)

OTHER PUBLICATIONS

PCT International Search Report performed by EPO Authorizing Officer Gerard Doolan; Completed Dec. 12, 2007.

(Continued)

*Primary Examiner*—Cam N Nguyen
(74) *Attorney, Agent, or Firm*—Bronwen M. Loeb; Drinker Biddle & Reath (57) ABSTRACT

The present invention provides for novel poisoning-resistant catalysts used for automobile exhaust gas treatment systems. To alleviate the detrimental affects of engine oil and/or fuel additive poisoning the present invention provides for an overcoat layer comprising a porous refractory oxide and one or more base metal oxides, which is coated over one or more precious metal containing washcoat layers. The overcoat of the present invention prevents phosphorous as well as other poisoning deposits, from fouling and/or negatively interacting with the underlying precious metal containing washcoats. In an alternative embodiment, the present invention provides for the coating of the upstream end of a catalytic member by the overcoat layer, thereby creating an upstream poison capture zone.

19 Claims, 3 Drawing Sheets

U.S. PATENT DOCUMENTS

| | | | |
|---|---|---|---|
| 4,587,231 A | 5/1986 | Sawamura et al. | |
| 4,674,447 A | 6/1987 | Davis | |
| 4,675,308 A * | 6/1987 | Wan et al. | 502/304 |
| 4,678,770 A * | 7/1987 | Wan et al. | 502/304 |
| 4,708,946 A | 11/1987 | Ohata et al. | |
| 4,714,694 A | 12/1987 | Wan et al. | |
| 4,727,052 A | 2/1988 | Wan et al. | |
| 4,923,842 A | 5/1990 | Summers | |
| 5,057,483 A * | 10/1991 | Wan | 502/304 |
| 5,202,300 A | 4/1993 | Funabiki et al. | |
| 5,254,519 A * | 10/1993 | Wan et al. | 502/252 |
| 5,407,880 A * | 4/1995 | Ikeda et al. | 502/67 |
| 5,427,601 A * | 6/1995 | Harada et al. | 75/235 |
| 5,459,119 A * | 10/1995 | Abe et al. | 502/326 |
| 5,696,065 A | 12/1997 | Tanaka et al. | |
| 5,753,581 A * | 5/1998 | Beckmeyer et al. | 502/304 |
| 5,943,857 A | 8/1999 | Ansell et al. | |
| 5,948,723 A * | 9/1999 | Sung | 502/303 |
| 5,989,507 A * | 11/1999 | Sung et al. | 423/213.5 |
| 6,294,140 B1 | 9/2001 | Mussmann et al. | 423/213.5 |
| 6,420,306 B2 * | 7/2002 | Kurokawa et al. | 502/261 |
| 6,432,859 B1 * | 8/2002 | Iwakuni et al. | 502/66 |
| 6,492,297 B1 * | 12/2002 | Sung | 502/304 |
| 6,497,851 B1 * | 12/2002 | Hu et al. | 423/213.5 |
| 6,514,905 B1 * | 2/2003 | Hanaki et al. | 502/328 |
| 6,645,439 B2 * | 11/2003 | Zhang et al. | 422/177 |
| 6,667,018 B2 * | 12/2003 | Noda et al. | 423/213.5 |
| 6,727,097 B2 | 4/2004 | Kumar et al. | |
| 6,770,590 B2 * | 8/2004 | Watanabe | 502/328 |
| 6,777,370 B2 * | 8/2004 | Chen | 502/241 |
| 6,921,738 B2 * | 7/2005 | Hwang et al. | 502/240 |
| 7,041,263 B2 * | 5/2006 | Sung | 423/239.1 |
| 7,056,859 B2 * | 6/2006 | Hachisuka | 502/327 |
| 7,081,430 B2 * | 7/2006 | Uenishi et al. | 502/327 |
| 7,235,511 B2 * | 6/2007 | Kawamoto et al. | 502/327 |
| 7,238,640 B2 * | 7/2007 | Jen et al. | 502/325 |
| 7,374,729 B2 * | 5/2008 | Chen et al. | 422/177 |
| 7,446,076 B2 * | 11/2008 | Miyoshi et al. | 502/326 |
| 7,534,738 B2 * | 5/2009 | Fujdala et al. | 502/74 |
| 7,547,656 B2 * | 6/2009 | Miura | 502/327 |
| 7,576,031 B2 * | 8/2009 | Beutel et al. | 502/339 |
| 7,638,459 B2 * | 12/2009 | Rende et al. | 502/300 |
| 2001/0006934 A1 * | 7/2001 | Kachi et al. | 502/325 |
| 2003/0188526 A1 | 10/2003 | Hepburn et al. | |
| 2004/0001781 A1 | 1/2004 | Kumar et al. | |
| 2004/0028589 A1 * | 2/2004 | Reisinger et al. | 423/240 S |
| 2004/0038812 A1 * | 2/2004 | Hachisuka | 502/243 |
| 2004/0082470 A1 * | 4/2004 | Gandhi et al. | 502/325 |
| 2004/0198595 A1 * | 10/2004 | Chen | 502/328 |
| 2005/0164879 A1 * | 7/2005 | Chen | 502/328 |

FOREIGN PATENT DOCUMENTS

| | | |
|---|---|---|
| JP | 55151109 | 11/1980 |
| JP | 56044411 | 4/1981 |
| JP | 59052530 | 3/1984 |
| JP | 60031828 | 2/1985 |
| JP | 61274746 | 12/1986 |
| JP | 63077544 | 4/1988 |
| JP | 63205141 | 8/1988 |
| WO | 02083301 | 10/2002 |
| WO | 2006044974 | 4/2006 |

OTHER PUBLICATIONS

U.S. Appl. No. 11/182,462, filed Jul. 15, 2005.

* cited by examiner

PHOSGARD, A NEW WAY TO IMPROVE POISON RESISTANCE IN THREE-WAY CATALYST APPLICATIONS

FIELD OF THE INVENTION

The present invention relates generally to a system for minimizing the deleterious impact of oil-derived and/or gasoline additive compounds on automotive exhaust gas treatment systems.

BACKGROUND OF THE INVENTION

Automotive emissions control is a mature industry. Automakers and suppliers have been challenged to control and reduce vehicle tailpipe emissions by the U.S. Clean Air Act in 1965 and subsequent legislation in other countries. Furthermore, vehicles sold in California, New York and Massachusetts must meet even more stringent emission standards established by the California Air Resources Board (CARB) and adopted by the other two states. CARB has also set future standards for new automobiles; such as Super Ultra Low Emission Vehicles (SULEV) and Partial credit Zero Emission Vehicles (PZEV).

Base engine emissions of controlled exhaust products have been reduced significantly over the past thirty years, as compliance with periodically decreasing tailpipe limits has been made possible through the use of catalytic converters. A catalytic converter typically contains one or more catalytic elements, which lower hydrocarbons (HC), carbon monoxide (CO) and/or nitrogen oxides ($NO_x$). Some catalyst systems are also designed to reduce particulate matter from diesel engines.

The individual catalysts may be coated onto ceramic or metal spheres or on metal screens which act as particulate filters. Most often, however, the active catalyst components are coated onto a ceramic or metal honeycomb element termed a "monolith." Also included in this category are monoliths applied as diesel particulate filters (DPFs). The active catalyst components may be supplied either directly to the monolith, or more typically as a component of a "washcoat" which can be an aqueous slurry of particulate supports such as metal oxides that are impregnated with the active catalytic component. The applied washcoat can be calcined, or may be deposited on the monolith after the metal oxide-supported catalyst has been calcined. A single catalytic converter or multiple converters may be used. As many as four or five monoliths may be placed in succession in the exhaust stream depending on the particular application.

Emissions requirements have become increasingly stringent, requiring development of both new catalysts and higher catalyst loadings. In addition to absolute emissions standards, emissions control system longevity, i.e. "durability", requirements have also been extended. This maintenance of operation requirement over extended periods has also challenged catalyst development, and has required still further increased catalyst performance levels. It is primarily the catalyst loading levels, in particular, precious metal loading, which controls the cost of the catalytic converter. Converters that meet all the requirements with a minimum of precious metal loading is one of the primary objectives of catalyst manufacturers.

Numerous reactions can occur during combustion of a hydrocarbon fuel in a variety of temperature and fuel/air stoichiometric environments and the products of such reactions can limit catalyst durability. For example, it was recognized quite early that lead, formerly supplied as an octane booster in fuel as tetraethyl lead, was a serious catalyst poison. The lead octane boosters, thus, have been removed from modern day fuels.

Other octane boosters added to non-leaded fuel, such as methylcyclopentadienyl manganese tricarbonyl (MMT), may result in manganese contained in the exhaust gas and which in excess amount, may coat, foul, or otherwise poison the catalytic layers. Thus, numerous trace elements still come into contact with the automotive exhaust catalysts, some unavoidably so, and several of these are known to decrease catalyst durability. Not all these poisonous trace elements are derived from the fuel.

For example, zinc dialkyldithiophosphates (ZDDPs) have been long used as antioxidants and/or high-pressure lubricant additives in motor oils. Especially with modern high-speed engines, increased piston/wall clearances and decreased sealing allow increased entry of oil into the combustion chamber, where oil additives, or their combustion byproducts, subsequently pass into the exhaust stream. Such catalytic poisoning mechanism is one of the primary obstacles to the durability of low emission catalyst systems. Trace amounts of zinc, phosphorus, calcium, and other elements are put in engine oil as anti-wear additives. The purpose of such additives is to protect engine parts from excessive wear during start-up, when engine oil is not coating the metal components of the engine. However, as the engine burns oil, zinc and phosphorus are exhausted through the catalytic converter, which may accelerate degradation of exhaust catalyst activity. Although the anti-wear additives could be removed from the oil, long-term durability of the engine could suffer.

The use of engine anti-wear additives, such as phosphorous and zinc, is described in many references. These additives include compounds such as ZDDPs, also referred to as zinc dithiophosphates (ZDTPs), and zinc dithiocarbamates (ZDTCs). Other disclosed zinc and phosphorous additives to oil include metallic detergents included as extreme pressure agents. Reference is made to U.S. Pat. Nos. 4,674,447 and 5,696,065. The phosphorous and zinc are disclosed as poisons lowering the function of the motor vehicle exhaust treatment catalyst.

Automotive oil additives, such as ZDDP, form an anti-wear coating on engine components and act as an antioxidant in the oil. Although engines are designed to minimize the quantity of engine oil exiting the engine via the combustion chamber and exhaust system, it is inevitable that a small fraction of engine oil is released by this mechanism. The ZDDP additive of engine oil deleteriously affects catalytic converters due to phosphorus from the ZDDP interfering with active sites within the catalyst. These phosphorus containing species can deposit onto, thereby fouling the catalyst surface, or react with washcoat components, such as aluminum oxide and cerium oxide, to form stable and interactive compounds, and remain there indefinitely. This phenomenon is commonly referred to as "phosphorus poisoning." Phosphorous poisoning can lead to a loss of washcoat surface area and precious metal dispersion causing fouling of the catalyst. Phosphorous species from ZDDP additive can also react with oxygen storage components causing a decrease in oxygen storage capacity.

The phosphorous poisoning mechanism is quite complex, and highly dependent upon the operating temperature, the oil consumption of the engine, and the source of the oil consumption. For example, as mentioned in U.S. Pat. No. 6,727,097, when oil leaks past the piston rings, and enters the combustion chamber, the oil goes through the combustion process. This will result in certain types of phosphorus and/or zinc compounds (among other contaminants). Particular compounds may have a particular deactivation effect on the catalytic converter, depending upon the operating condition. On the other hand, oil that leaks past the exhaust valve guide and stem, may not go through the combustion process, and result in a different type of poisoning of the catalytic converter, namely, forming a glaze layer covering the catalytic layers.

Measures to eliminate or reduce ZDDP in engine oils have been investigated. Alternatives to ZDDP have been produced which have been shown to provide antioxidant and anti-wear properties similar to ZDDP. However, the ZDDP alternatives are cost prohibitive. Engine oils may be formulated with a lesser amount of ZDDP with the consequences that engine wear and oil oxidation increase, the former limiting engine life and the latter reducing useful oil life.

It is well known in the art to utilize catalyst compositions to treat gaseous streams such as the exhaust gases of internal combustion engines. It is also well known that sulfur oxides ($SO_x$) and phosphorous oxides ($PO_x$) tend to poison, i.e., deactivate many catalysts used for such treatment. $SO_x$ is a particular problem inasmuch as it is generated by the oxidation of sulfur compound impurities often found in gasoline and diesel fuel. $PO_x$ is often generated from phosphorous compounds in engine lubricating oils. It is known in the art (see, e.g., U.S. Pat. Appln. No. 2003/0188526) to place a guard (e.g., alumina) or filter ahead of a catalyst to attempt to protect the catalyst from $SO_x$ and/or $PO_x$. However, difficulties are encountered when space under the car becomes limited for any additional device or the guard or filter only traps a portion of the poisons and lets others bleed though and deposit on catalytic layers.

It was proposed in Japanese applications JP 55 151109 and JP 56 044411, to insert an alumina-containing phosphorus trap in the oil recirculation system to remove suspect components from the oil being recirculated, and thus protect the exhaust catalyst. However, such systems are inefficient in the degree of protection achieved, may become rapidly fouled, and may remove desirable antioxidant from the oil.

It is known in the prior art to use combinations of sorbents and catalysts to reduce catalytic poisoning. This is shown, for example, at pages 45-48 of the publication Environmental Catalysis For A Better World And Life, Proceedings of the 1st World Congress at Pisa, Italy, May 1-5, 1995, published by the Societa Chimica Italiana of Rome, Italy, in an article entitled "The New Concept 3-Way Catalyst For Automotive Lean-Burn Engine Storage and Reduction Catalyst", by Takahashi et al. This article deals with $NO_x$ abatement in lean $NO_x$ gases and shows materials comprising precious metals, mainly platinum, and various alkaline and alkaline earth metal oxides, mainly barium oxide and rare earth metal oxides, disposed on supports such as alumina. At page 47 of the article, there is disclosed the concept of employing $NO_x$ storage compounds and catalytic components dispersed on a common support material.

U.S. Pat. No. 5,202,300, "Catalyst For Purification of Exhaust Gas", issued on Apr. 13, 1993, to M. Funabiki et al, discloses a catalyst composition comprising a refractory support having deposited thereon an active layer containing a palladium and rhodium catalytic metal component dispersed on alumina, a cerium compound, a strontium compound and a zirconium compound.

U.S. Pat. Nos. 4,714,694, 4,727,052, and 4,708,946 disclose the use of bulk cerium oxide (ceria) to provide a refractory oxide support for platinum group metals other than rhodium. Highly dispersed, small crystallites of platinum on the ceria particles may be formed and stabilized by impregnation with a solution of an aluminum compound followed by calcination.

Japanese Patent Publication No. 52530/1984 discloses a catalyst having a first porous carrier layer composed of an inorganic substrate and a heat-resistant noble metal-type catalyst deposited on the surface of the substrate and a second non-porous carrier layer having a heat resistant noble metal catalyst supported on the surface of said porous carrier layer.

Japanese Patent Publication No. 31828/1985 discloses a catalyst for purifying exhaust gases comprising a honeycomb carrier and a noble metal having a catalytic action for purifying exhaust gases. The carrier is coated with two slurries containing different kinds of alumina powder. Subsequently, the alumina-coated honeycomb is immersed in a noble metal solution.

Japanese Patent J-63-205141-A discloses a layered automotive catalyst in which the bottom layer comprises platinum or platinum and rhodium dispersed on an alumina support containing rare earth oxides, and a topcoat, which comprises palladium and rhodium dispersed on a support comprising alumina, zirconia and rare earth oxides.

Japanese Patent J-63-077544-A discloses a layered automotive catalyst having a first layer comprising palladium dispersed on a support comprising alumina, lanthana and other rare earth oxides and a second coat comprising rhodium dispersed on a support comprising alumina, zirconia, lanthana and rare earth oxides.

U.S. Pat. No. 4,587,231 discloses a method of producing a monolithic three-way catalyst for the purification of exhaust gases. A mixed oxide coating is applied to a monolithic carrier by treating the carrier with a coating slip in which an active alumina powder containing cerium oxide is dispersed together with a ceria powder and then baking the treated carrier. Platinum, rhodium and/or palladium are then deposited on the oxide coating by a thermal decomposition. Optionally, a zirconia powder may be added to the coating slip.

U.S. Pat. No. 4,923,842 discloses a catalytic composition for treating exhaust gases comprising a first support having dispersed thereon at least one oxygen storage component and at least one noble metal component, and having dispersed immediately thereon an overlayer comprising lanthanum oxide and optionally a second support. The layer of catalyst is separate from the lanthanum oxide. The noble metal can include platinum, palladium, rhodium, ruthenium and iridium. The oxygen storage component can include the oxide of a metal from the group consisting of iron, nickel, cobalt and the rare earths. Illustrative of these are cerium, lanthanum, neodymium, praseodymium, etc.

Engine technology and exhaust gas treatment technology have reduced the level of lubricating oil, including phosphorous and zinc compounds, passed by engines to the exhaust treatment catalysts, and the catalysts have been sufficiently active to treat exhaust gases in accordance with various government regulations. However, as engine performance continues to increase and environmental regulations become more stringent, exhaust catalyst activity will have to be increased and maintained with longer engine life, for example, 150,000 miles. It is common also that the oil consumed by an engine increases as the mileage increases (e.g., >100,000 miles). Accordingly, there will be a greater build up of compounds, particularly phosphorous and/or zinc compounds and others, passing to the emission treatment catalyst from the engine. Low emission vehicles could benefit from exhaust aftertreatment systems with a tolerance for engine oil or fuel additive poisons.

It is desirable to have a poisoning resistant catalyst that maintains its functionality as both engine performance and lifespan increase. It would be desirable to provide a means whereby catalyst poisons, which lower emission catalyst durability, can be effectively removed or sufficiently tolerated without requiring increased precious metal catalyst loading in catalyst to compensate for reduced catalyst activity.

SUMMARY OF THE INVENTION

An exhaust gas treatment system for an internal combustion engine is disclosed, which mitigates deleterious poisoning of a catalytic member. The catalytic member of the present invention comprises a substrate, coated with at least one washcoat layer containing one or more catalysts, for the abatement of pollutants, especially nitrogen oxides (NOx), hydrocarbons (HC), and carbon monoxides (CO). The catalytic member further comprises an overcoat layer, which captures, traps, reacts, and/or holds incoming catalyst poisons such as phosphorous, zinc, calcium, and manganese derivatives (e.g., MMT), thereby preventing and/or reducing fouling or poisoning of the catalytic washcoat layer. Without interference from traditional catalytic poisoning the overall catalytic activity and thus the long-term durability of the precious metal components are enhanced. Inversely, an increase in aged catalytic activity and durability allows for a decrease in the necessary amounts of expensive precious metals within the catalytic system.

In one embodiment, a thin layer containing highly porous refractory oxide and optionally containing one or more base metal oxides, can be coated over the catalytically coated substrate to protect the catalytic layers from fouling and/or negative interactions after thermal migration by trapping the incoming poisons, such as P, Zn, Ca, Mn, sulfur, etc., derived from gasoline or engine oil additives.

DETAILED DESCRIPTION OF THE INVENTION

Automotive exhaust gas catalyst compositions are typically coated onto a suitable heat- and chemical-resistant substrate. The catalyst coating composition, when applied to the substrate in a slurry or liquid form, is referred to as a washcoat. Such automotive catalysts are susceptible to poisoning due to lubricant oil- or fuel additive-derived phosphorus, zinc, calcium, manganese, sulfur and other compounds. The poisons may accumulate on the surface of the washcoat, creating a physical diffusion barrier, or they may interact with the catalytic material in the washcoat, resulting in loss of catalytic activity. The poison level and type can vary, depending upon the design of the engine and the operating conditions and location of catalyst.

In accordance with the present invention there is provided an exhaust gas treatment system containing a catalytic member or catalytic converter comprising a substrate on which is coated one or more washcoat layers, each containing one or more catalysts for the abatement of pollutants, especially NOx, HC, and CO. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated. The catalytic member is further coated with a thin, axially zoned overcoat layer, which captures, traps, reacts, and/or holds incoming catalyst poisons such as phosphorous, zinc, calcium, and manganese derivative (e.g., MMT), thereby mitigating deleterious poisoning of the catalytically coated substrate. The catalyst washcoats and overcoat of the present invention are carried on a suitable carrier or substrate such as a monolithic substrate comprising a refractory ceramic or metal honeycomb structure, or refractory particles such as spheres or short, extruded segments of a suitable refractory material.

The overcoat layer of the present invention can be coated over a catalytically coated substrate for mitigating deleterious poisoning of the underlying catalyst. Preferably, the overcoat layer of the present invention is coated over one or more washcoat layers, which contain one or more catalysts and optionally an oxygen storage component. However, the overcoat layer may also be located between one or more catalyst containing washcoat layers.

Figure 5:
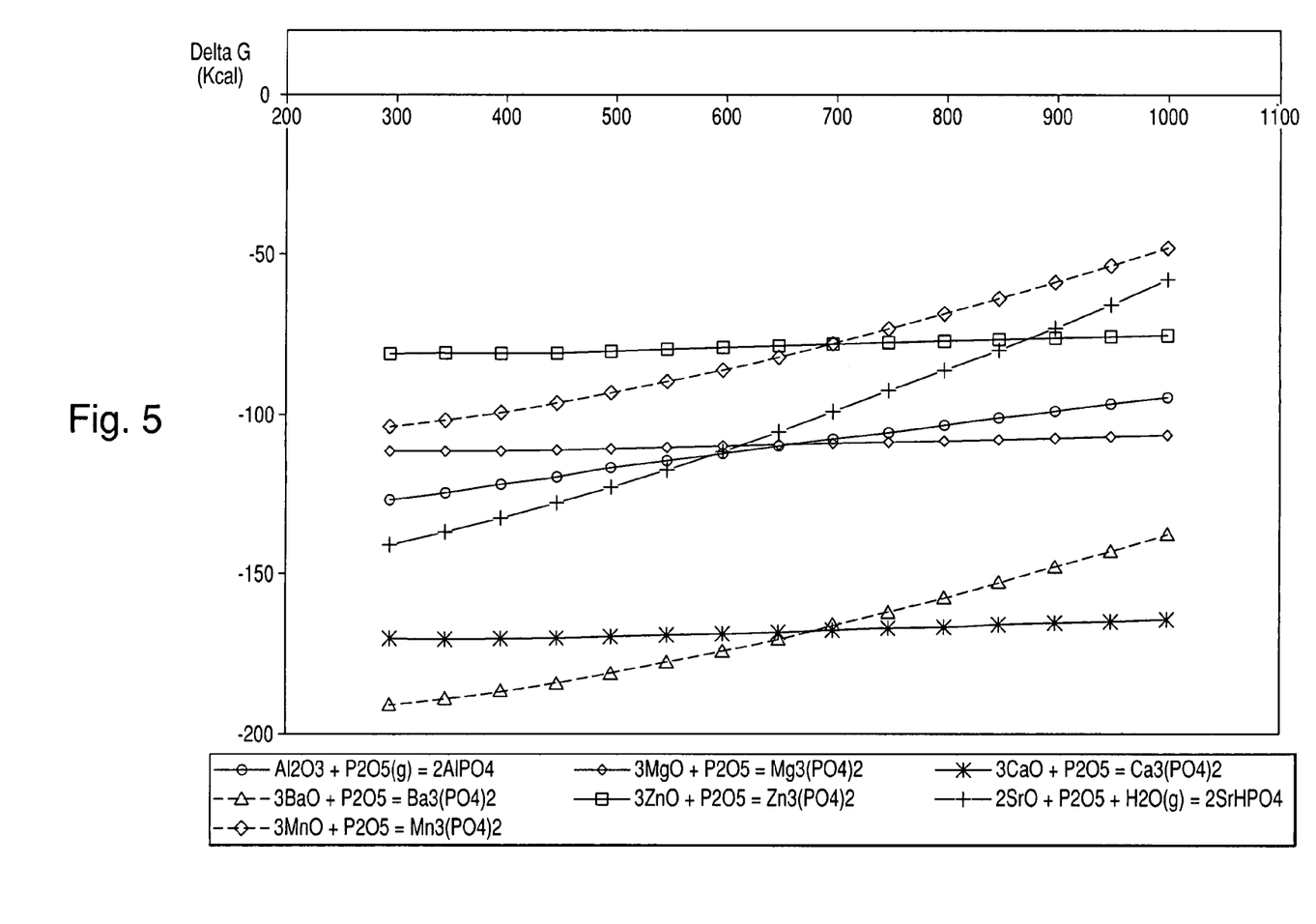
FIG. 5 is a graphic presentation of the calculated delta-G of formation for various compounds formed between phosphorous and base metal oxides at temperatures from 300° to 1000° C.

More specifically, the overcoat layer of the present invention comprises a thin layer containing a highly porous refractory oxide and one or more base metal oxides. Preferably, the overcoat layer is devoid of any precious metals. However, the overcoat layer may contain a low amount of one or more precious metals. As used herein, a "low amount" of one or more precious metals means the overcoat layer may contain a total precious metal loading of less than 20 $g/ft^3$, less than 5 $g/ft^3$, less than 3 $g/ft^3$, or less than 1 $g/ft^3$. The highly porous refractory oxide of the overcoat layer provides a porous matrix to trap catalyst poisons. The porous matrix also provides a support for the base metal oxides, while still allowing exhaust gas to penetrate to the underlying catalyst. In general, any known highly porous refractory oxide can be used, such as alumina, silica, titania, zirconia, or silica-alumina, and which contains an intra- and/or inter-particle pore radius size of about 10 to about 500 angstroms, and inter-particle sizes from 100 to 500 angstroms. Pore radius sizes of about 20 to about 300 angstroms, or of about 30 to about 250 angstroms, are also exemplified. Preferably, the overcoat layer contains alumina or stabilized alumina. The base metal oxides of the overcoat layer, capture, trap, react with, and/or hold incoming catalyst poisons such as phosphorous, zinc, calcium, and manganese derivatives (e.g., MMT), by forming strong and stable complexes thereby greatly reducing the thermal migration of such poisons under high temperature conditions, and therefore minimizing the encounter of underlying catalytic components with such poisons. In general, the base metal oxides can be any known elemental or composite base metal oxide. Preferred base metal oxides, such as alkaline earth metal oxides (e.g., BaO and SrO), are chosen that best react with acidic poisons (P, S, etc.) to form stable compounds (e.g., Ba or Sr phosphates and/or sulfates), which retard migration of such poisons to the underneath catalytic layers during high temperature operation. The relative stability of a compound formed between a poison and base metal oxide can be predicted by calculating the delta-G of formation for that compound. FIG. 5 shows the delta-G of formation (Gibbs Free Energy) for various poison and base metal oxide compounds at various temperatures. For example, Ba forms a very stable compound with phosphorous ($Ba_3(PO_4)_2$) from 300 to 1000° C. (see, e.g., FIG. 5). A negative delta-G means the reaction is spontaneous, and a large negative delta-G denotes the product of the reaction is thermodynamically stable and preferred. Useful base metal oxides include, but are not limited to, oxides of alkaline earth metals, such as Mg, Ca, Sr, Ba, first, second, third and fourth transition series metals, alkali metals, such as Mn, Zn, and rare earth metals, such as Ce, Pr, Nd, with alkaline earth metal oxides being preferred, and Sr and Ba being exemplified.

The overcoat layer should be thin enough and porous enough so to prevent imposing a significant diffusional barrier for exhaust gas penetration to the underneath catalytic layer(s). Furthermore, the overcoat layer should be thin enough and porous enough to not introduce a disadvantageous amount of thermal mass so as to retard heat-up rate of the front light-off section of the catalytic member. The overcoat layer of the present invention is typically at least 10 and up to 120 microns thick. Also exemplified are overcoat layer depths of about 10 to about 60 microns, and of about 20 to about 40 microns thick. Overcoat layers of at least 20, at least 30, at least 40, at least 50, at least 60 and up to 80 microns thick are also exemplified. The overcoat layer preferably has a washcoat loading of 0.1 to 4.0 $g/in^3$, however, 0.2 to 2.0, 0.2 to 1.0 and 0.4 to 0.6 $g/in^3$ are also exemplified. The overcoat layer can contain a base metal oxide loading of from 0.01 to 0.4 $g/in^3$. Base metal oxide loadings from 0.02 to 0.2 $g/in^3$ and from 0.05 to 0.2 $g/in^3$ are also exemplified. The amount of base metal oxide contained in the overcoat layer can also be expressed as from 2 to 40% by weight or from 10 to 25% by weight of the total washcoat loading.

In general, the catalytic member of the present invention comprises at least one precious-metal containing washcoat layer applied or coated to a substrate for the abatement of pollutants and an overcoat layer for the abatement of poisonous species such as P, Zn, Ca, Mn, S, etc., thereby preventing fouling or poisoning of the catalytic washcoat layer.

Figure 1:
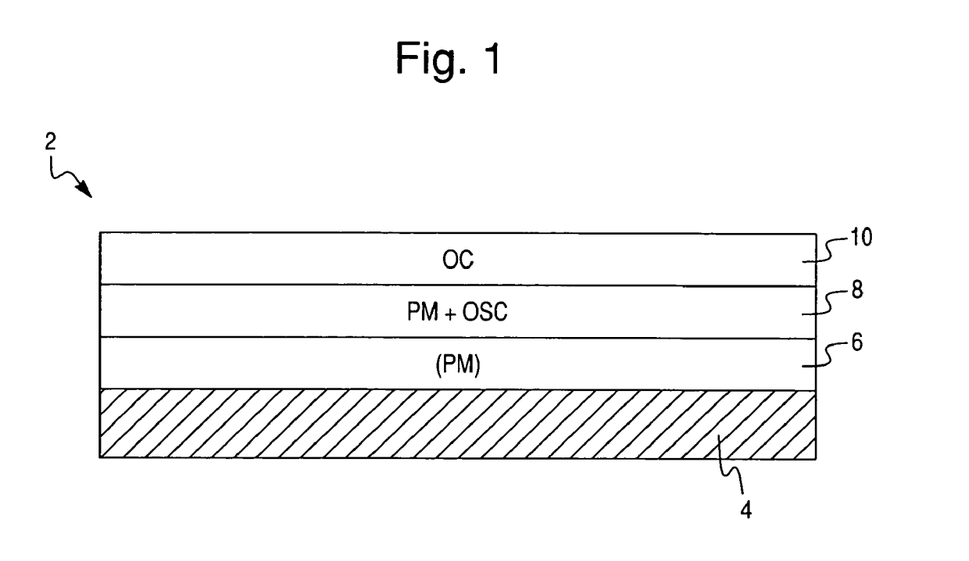
FIG. 1 is a schematic view showing a configuration of layers on a catalytic member of an exhaust gas treatment system resistant to poisoning according to an embodiment of the present invention.

The catalytic member of the present invention may be more readily appreciated by reference to the Figures, which are merely exemplary in nature and in no way intended to limit the invention or its application or uses. Referring in particular to FIG. 1 a configuration of the catalytic member 2 of an exhaust gas treatment system is shown in accordance with one embodiment of the present invention. The catalytic member 2 comprises, a substrate 4, typically a honeycomb monolith substrate, which is coated with a first or bottom washcoat layer 6, containing one or more precious metal catalysts, and a second or middle washcoat layer 8 also containing one or more precious metal (PM) catalysts, and optionally an oxygen storage component (OSC). The precious metal catalysts and oxygen storage components used in the practice of the present invention are discussed in more detail hereinbelow.

The catalytic member 2 further comprises an overcoat layer (OC) 10, which is applied or coated over the middle washcoat layer for the mitigation of deleterious poisoning of the underlying catalyst. The overcoat layer 10 comprises a thin layer comprising a highly porous refractory oxide (e.g., alumina) and a base metal oxide (e.g., SrO or BaO), which can be coated over the catalytically coated substrate 4 to protect the catalyst layers from fouling by incoming poisons, such as P, Zn, Ca, Mn, sulfur, etc. In this embodiment of the invention, the bottom washcoat layer 6, middle washcoat layer 8, and overcoat are coated over the entirety of the axial length of the substrate 4. The precious metal and OSC-containing layers will generally contain a precious metal loading of from about 2 to 500 $g/ft^3$. Loadings of precious metal from 10 to 100 $g/ft^3$ and 30 to 60 $g/ft^3$ are also exemplified. OSC loading levels are typically from 0 to 4 $g/in^3$, with 0.2 to 1.0 $g/in^3$ also exemplified.

Optionally, the coating process can be manipulated such that the overcoat layer is applied over only a fraction of the middle coat layer. In this embodiment, the overcoat layer can be applied or coated to the upstream portion of the substrate, thereby creating an upstream poison capture zone. As used herein and in the appended claims, the terms "upstream" and "downstream" refer to relative directions according to the flow of an engine exhaust gas stream. The majority of the deleterious deposits typically accumulate within this upstream poison capture zone. A poison capture zone is discussed in commonly assigned co-pending application U.S. Ser. No. 11/182,462, filed Jul. 15, 2005, which is incorporated herein by reference.

Figure 2:
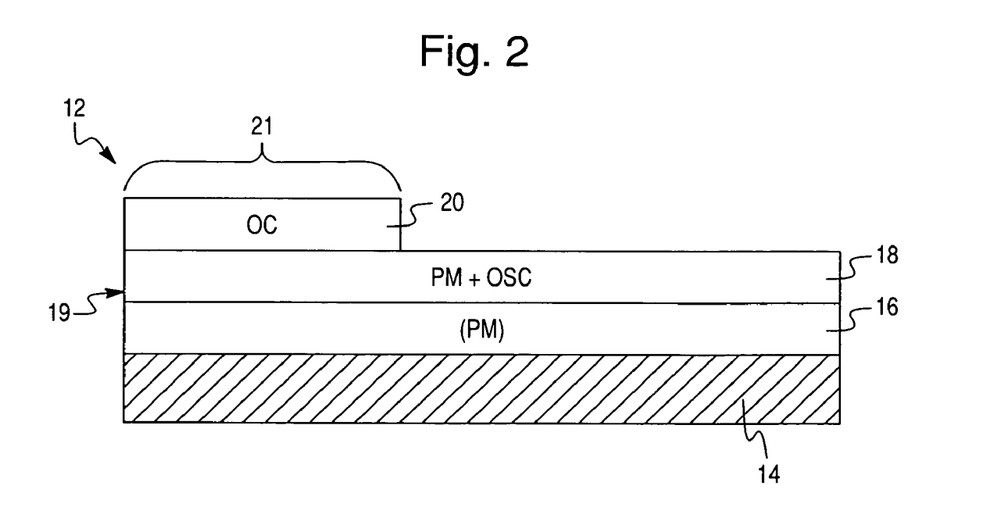
FIG. 2 is a schematic view showing another configuration of layers on a catalytic member resistant to poisoning according to an embodiment of the present invention.

As shown in FIG. 2 the overcoat layer (OC) 20 is coated only over the upstream portion of the substrate thereby creating a poison capture zone 21. The overcoat layer 20 comprises a thin layer comprising a highly porous refractory oxide (e.g., alumina) and one or more base metal oxides (e.g., SrO or BaO). Typically, the coated portion or poison capture zone 21 comprises a length of at least 0.5 inches, and up to a length of about 5.0 inches, from the upstream edge 19 of catalytic member 12. Coated portions or poison capture zones 21 of at least 1, 2, 3, or 4 inches from the upstream edge 19 of catalytic member 12 are also exemplified. In this embodiment, the bottom washcoat layer 16, and middle washcoat layer 18 cover the entirety of the axial length of the substrate 14. The bottom layer typically contains one or more precious metal (PM) catalysts for the abatement of pollutants, e.g., NOx, HC, and CO. The middle washcoat layer 18 typically contains high levels of one or more precious metal (PM) catalysts and optionally an oxygen storage component (OSC). The level of the precious metals and oxygen storage component used in the practice of this embodiment of the present invention are typically the same as described for FIG. 1.

Preferably, the poison capture zone 21 is porous so as to more effectively trap inorganic poisons. Poison capture zones having lengths from about 1.0 to about 3.5 inches and from about 1.5 to about 2.5 inches from the upstream edge of the catalytic member are also exemplified. Gas entry into the catalytic member produces a turbulent zone in the upstream region of the catalytic member, typically within the first 1.5 inches, e.g., as a function of hydraulic diameter Dh defined by cross-section area divided by perimeter of the cell. Catalytic poisons (P, Mn, Zn, Ca, etc.) predominantly deposit within the first 2.5 inches of the catalytic member. In view of the presence of poison capture zone 21, any such deposited poisons are trapped or otherwise held in the overcoat layer 20 which forms poison capture zone 21. As a result, providing greater catalytic durability and lifespan. Therefore, use of over-designed amounts of expensive catalytic materials to accommodate poison fouling after long-term aging, can be avoided.

The length of the poison capture zone 21, that being the portion of the catalytic member, which is coated with overcoat layer, can also be described as a percentage of the length of the catalytic member from the upstream to downstream edge. Typically, the poison capture zone 21 will comprise from about 3 to about 70% of the length of the catalytic member. Also exemplified are poison capture zones comprising from about 10 to about 60% and from about 20 to about 50% of the upstream axial length of the catalytic member.

Poison capture zones of up to about 30% of the length of the catalytic member are also exemplified.

Figure 3:
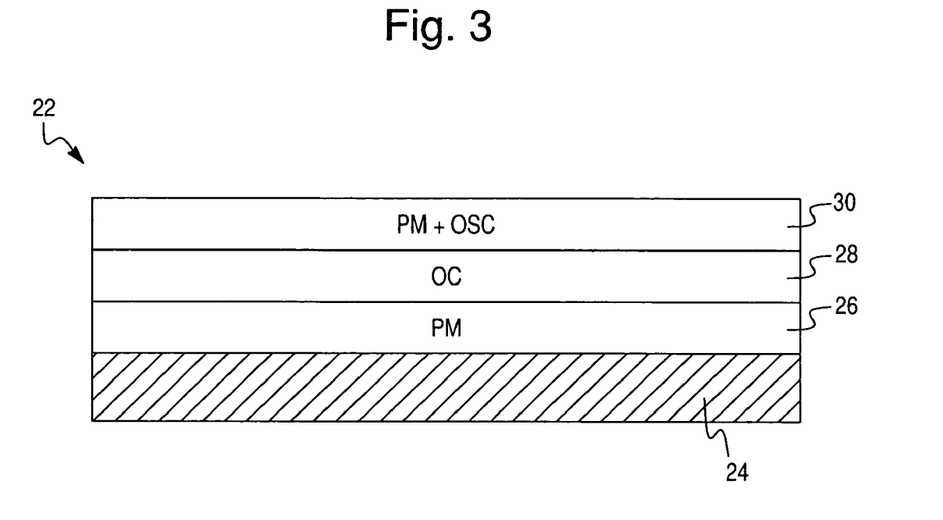
FIG. 3 is a schematic view showing another configuration of layers on a catalytic member resistant to poisoning according to an embodiment of the present invention.

Another embodiment of the present invention, depicted in FIG. 3 shows an alternative configuration of a catalytic member, in accordance with the present invention. In this embodiment of the present invention, the catalytic member 22 comprises a substrate 24, such as a honeycomb monolith, and contains three layers coated thereon. A first or bottom washcoat layer 26 is coated over the entirety of the substrate 24 and generally comprises one or more precious metal (PM) catalysts. The second, or in this case, overcoat layer 28 comprises a thin layer containing a highly porous refractory metal oxide (e.g., highly porous alumina) and one or more base metal oxides (e.g., SrO or BaO), which can be coated over the entire axial length of the catalytically coated substrate 24 to protect the underlying catalytic layers, which may be sensitive to incoming poisons, such as P, Pb, Zn, Ca, Mn, sulfur, etc. In this embodiment, a third layer or top washcoat layer 30 comprises one or more precious metal (PM) catalysts and optionally an oxygen storage component (OSC). The top washcoat layer 30 is coated over the entirety of the axial length of the washcoated substrate. The precious metal catalysts and oxygen storage components used in the practice of this embodiment are discussed in more detail hereinbelow. In the practice of this embodiment, the use of precious metal catalysts, which are less sensitive to poisoning, such as Pt and/or Rh, may be preferred. The level of the precious metals and oxygen storage components used in the practice of this embodiment of the present invention are typically the same as described for FIG. 1.

Figure 4:
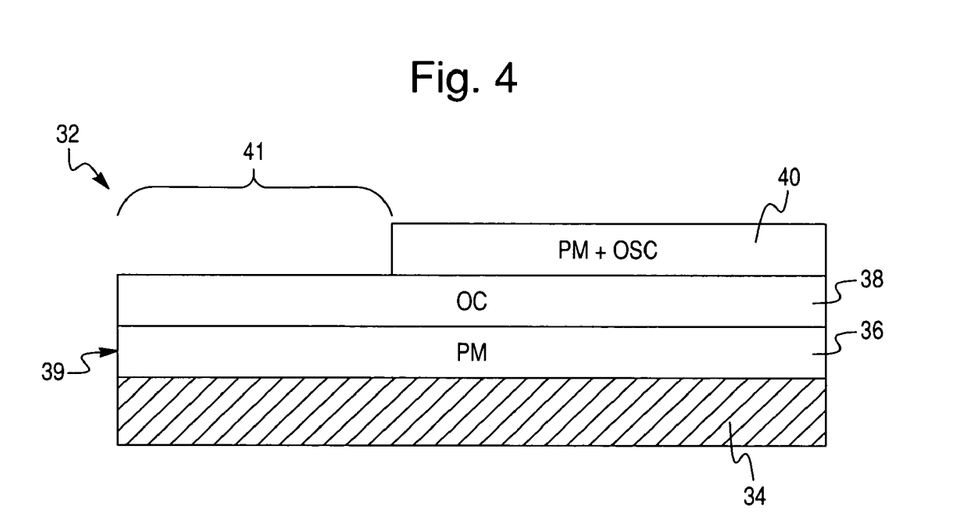
FIG. 4 is a schematic view showing another configuration of layers on a catalytic member resistant to poisoning according to an embodiment of the present invention.

In yet another embodiment, the washcoat coating process can be optionally manipulated such that the precious metal containing top washcoat layer is applied as a washcoat over only a downstream fraction of the overcoat layer, thereby excluding an upstream poison capture zone. As shown in FIG. 4, the top washcoat layer 40 can be coated only over a downstream portion 42 of the substrate, thereby creating an upstream uncoated portion or poison capture zone 41. The catalytic member 32 comprises a first or bottom washcoat layer 36 and an overcoat layer 38, both of which are applied or coated over the entirety of axial length of the substrate 34. The overcoat layer (OC) comprises a thin layer containing a highly porous refractory oxide (e.g., highly porous alumina) and one or more base metal oxides (e.g., SrO or BaO) to protect the catalytic layers from fouling by the incoming poisons, such as P, Zn, Ca, Mn, sulfur, etc. Typically, the uncoated portion or poison capture zone 41 comprises a length of from about 0.5 to about 5.0 inches from the upstream edge 39 of catalytic member 32. Uncoated portions or poison capture zones 41 of at least 1, 2, 3, or 4 inches from the upstream edge 39 of catalytic member 32 are also exemplified. The poison capture zone of this embodiment can be further defined as described hereinabove. The level of the precious metals and oxygen storage components used in the practice of this embodiment of the present invention are typically the same as described for FIG. 1.

The bottom, middle, and/or top catalyst washcoat layers of the present invention may also contain components, which interact with poisonous species (e.g., P, Zn, Ca, Ma, S, etc.) to trap and maintain these poisons in the bottom coat region. Examples of such components include alumina, barium, calcium, strontium, magnesium, and/or cerium oxide.

The precious metal component of the present invention comprises one or more precious metals selected from the group consisting of gold, silver and platinum group metals. As used herein, the term "platinum group metals" means platinum, rhodium, palladium, ruthenium, iridium, and osmium. The precious metal component of the present invention may also include gold, silver or platinum group metal compound, complex, or the like which, upon calcination or use of the catalyst decomposes or otherwise converts to a catalytically active form, usually, the metal or the metal oxide. The catalyst of this invention comprises at least one precious metal component in an amount sufficient to provide compositions having significantly enhanced catalytic activity to oxidize hydrocarbons and carbon monoxide and reduce nitrogen oxides. The precious metal containing layers will generally contain a precious metal loading of from about 2 to about 500 g/ft$^3$. Loadings of precious metal from 10 to 100 g/ft$^3$ and 30 to 60 g/ft$^3$ are also exemplified.

The precious metal component, such as a platinum group metal catalytic component, can be a suitable compound, and/or complex of any of the platinum group metals to achieve dispersion of the catalytic component on a support, such as a refractory oxide support, preferably activated alumina and/or ceria-zirconia composite support particles. Water soluble compounds or water dispersible compounds or complexes of one or more platinum group metal components may be utilized as long as the liquid used to impregnate or deposit the catalytic metal compounds onto the support particles does not adversely react with the catalytic metal or its compound or complex or the other components of the slurry, and is capable of being removed from the catalyst by volatilization or decomposition upon heating and/or the application of vacuum. In some cases, the completion of removal of the liquid may not take place until the catalyst is placed into use and subjected to the high temperatures encountered during operation.

Generally, both from the point of view of economics and environmental aspects, aqueous solutions of soluble compounds or complexes of the platinum group metals are preferred. For example, suitable compounds are chloroplatinic acid, amine solubilized hydroxide complexes of platinum, rhodium chloride, rhodium nitrate, hexamine rhodium chloride, palladium nitrate or palladium chloride, etc. During the calcination step, or at least during the initial phase of use of the catalyst, such compounds are converted into a catalytically active form of the platinum group metal or a compound thereof, typically an oxide and fixed onto the substrate.

The method of fixing the precious metal component can comprise chemically fixing the precious metal component on the refractory oxide support or, alternatively, the step of fixing can comprise thermally treating the precious metal component. The step of fixing comprises calcining the precious metal component on the refractory oxide support. The step of calcining can be conducted at from 180° C., preferably 200° C. to 900° C. at from 0.2 to 10 hours. The steps of thermally fixing each layer can be conducted after coating and prior to coating a subsequent layer.

Typically, one or more of the precious metal containing washcoats and/or the overcoat layer may contain one or more oxygen storage components (OSC). The oxygen storage component may comprise one or more reducible oxides of one or more rare earth metals. Preferred examples of suitable oxygen storage components include ceria, a mixed oxide of cerium and zirconium and a mixed oxide of cerium, zirconium, praseodymium, lanthanum, and/or neodymium. The oxygen storage component is preferably in composite or bulk form. By composite or bulk form it is meant that the oxygen storage composition is present as discrete but uniform crystallite particles, which may be as small as 0.01 to 15 micrometers in diameter or smaller, as opposed to having been dissolved in solution with the support precious metal. Bulk cerium oxide (ceria) is disclosed to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694 of C. Z. Wan et al, discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. No. 4,727,052 of C. Z. Wan et al and in U.S. Pat. No. 4,708,946 of Ohata et al.

Optionally, the oxygen storage composition may further comprise additional components, selected from the group consisting of compounds containing yttrium, niobium, lanthanum, praseodymium, neodymium, promethium, samarium, dysprosium and ytterbium. While not wishing to be bound to any theory, these components are believed to promote structural stability and/or chemical activity. Lanthanum oxides are exemplified stabilizers. The Pr, Sm and Nd components may further act as oxygen storage components. The oxygen storage composition is therefore stabilized against deactivating when used in high temperature environments such as temperatures of from 550° C. to 1100° C.

A preferred oxygen storage composition in the specific composition comprises the ceria-zirconia composite additionally containing one or more of neodymia, praseodymia, lanthana, and other rare earth oxides. The zirconium, rare earth composition recited above is in particulate form to permit the ceria, neodymia, praseodymia and zirconia to be in proximity to each other. It is believed that particles containing these components benefit by their interaction. So long as this proximity of components is maintained the composition can be added to the catalyst composition in any form, preferably composite or bulk (particulate) form. The OSC-containing layers will generally contain an oxygen storage component level of from 0 to 4 g/in$^3$ and 0.2 to 1.0 g/in$^3$ are exemplified.

The addition of further layers and different layer configurations are well within the scope and spirit of the present invention. Any layer that includes a precious metal can be provided with a poison capture zone as discussed above. The experimental Examples expressly disclosed are only a few of the many possible embodiments of the present invention.

EXAMPLES

Example 1

Control Washcoat Formulation

This example exemplifies a two-layer coating formulation useful for the treatment of exhaust gases, in accordance with one embodiment of the present invention. This two-layer formulation is a three-way conversion catalyst coating, which is coated onto a substrate carrier. The carrier is a cylindrical cordierite monolithic honeycomb with a diameter of 3.66 inches and a length of 5.81 inches, and with a cell density of 600 cpsi (cells per square inch) with cell wall thickness of about 3.5 mils. Total volume is 1 liter or 61 in$^3$. A first layer in the form of an aqueous media of ~40% solid content was applied to the surface of the substrate. The aqueous media of the first layer contained 14.1 g of palladium impregnated as palladium nitrate solution by a Planetary mixer into 1157 g of 10% baria-stabilized γ-alumina, 109 g strontia, 109 g lanthania, 101 g neodymia and 33.6 g zirconia binder. The coated carrier was then calcined at 530° C. for 2 hours to obtain a dried washcoat of about 108 g.

The second layer in the form of aqueous media of ~32% solid content was applied to the surface of the first layer. The aqueous media of the second layer contained 3.85 g of rhodium impregnated as rhodium nitrate solution by a Planetary mixer into 1091 g ceria/zirconia composites with 30% ceria, plus 303 g ceria/zirconia composites with 20% ceria, with rhodium distribution on these two materials being 80% to 20%, 94 g alumina binder and 47 g zirconia binder. The resultant carrier was then calcined at 430° C. for 2 hours to obtain a dried washcoat of about 79 g.

Example 2

Waschoat Formulation with an Overcoat PHOSGARD Layer

This example exemplifies a three-layer coating formulation useful for the treatment of exhaust gases, in accordance with one embodiment of the present invention, which is resistant to poisoning. The three-layer formation used the first and second catalyst layers of Example 1 with the addition of a third layer coated over the second layer of Example 1. The third layer in the form of aqueous media of ~20% solid content was applied to the surface of the second layer throughout the axial length. The aqueous media of the third layer contained 634 g baria doped γ-alumina with approximately 10% by wt. Baria, 111 g strontia, 50 g alumina binder and 25 g zirconia binder. The coated carrier was then calcined at 430° C. for 2 hours to obtain a dried washcoat of about 40 g.

Example 3

The catalysts in Examples 1 and 2 were tested by published MVEG (Motor Vehicle Emissions Group) test cycles, which consists of an ECE (Urban Drive Cycle) and an EUDC (Extra Urban Drive Cycle) segment, on a vehicle with a 2.0 L engine. The ECE cycle is an urban driving cycle devised to represent city driving conditions and is characterized by low speed, low engine load and low exhaust gas temperatures. The EUDC cycle is a test devised to represent highway driving conditions and is characterized by higher speeds and higher exhaust gas temperatures and volume. The catalysts were all 100 hours engine aged with maximum catalyst bed temperature around 900° C., and the gasoline fuel added with 12 mg/L phosphorous as ZDDP. Emissions are collected and measured for each test and the results are tabulated as milligrams of gas released per kilometer traveled. The results are shown in Table 1.

TABLE 1

|  | Catalyst | | | |
|---|---|---|---|---|
|  | ECE Test | | EUDC Test | |
|  | Pollutant (mg/km) | | | |
|  | NOx | HC | NOx | HC |
| Example 1 | 97 | 216 | 36 | 7 |
| Example 2 | 80 | 168 | 46 | 9 |

Since the front portion of the catalyst is more critical to the activity during the cold-start ECE cycles, the third layer contained in the washcoat formulation of Example 2 provided protection of the front zone from poisoning, and thus, showed lower NOx and HC emissions. However, coating the whole length with a third layer showed some undesirable effects on the hot performance during EUDC cycles. It was thought that the inferior EUDC emissions were a result of a diffusional barrier created by the overcoat layer, thereby limiting diffusion of reactant gases to the underlying catalytic layer, especially with high flow rate allowing less residence time under high temperature conditions. In order to retain the benefits of front poison-capture zone while not introducing additional diffusional limits to the rear zone catalytic layers, the following examples (Examples 4-6) were performed.

Example 4

Control Washcoat Formulation

This example exemplifies a two-layer coating formulation with the first layer identical to that of Example 1. The second layer in the form of an aqueous media of ~32% solid content was applied to the surface of the first layer. The aqueous media of the second layer contained 3.85 g of rhodium impregnated as rhodium nitrate solution by a Planetary mixer into 637 g ceria/zirconia composites with 30% ceria, plus 212 g ceria/zirconia composites with 5% ceria, 45 g alumina binder and 27.5 g zirconia binder. The resultant carrier was then calcined at 430° for 2 hours to obtain a dried washcoat of about 70 g.

Example 5

Washcoat Formulation with Inlet PHOSGARD Layer

This example exemplifies a three-layer coating formulation useful for the treatment of exhaust gases, in accordance with one embodiment of the present invention, which is resistant to poisoning. This formulation used finished double-layer catalyst from Example 4 with the addition of a third layer coated over the second layer of Example 4. The third layer is identical to the third layer described in Example 2. After coating the whole length, catalyst was cut into two equal lengths around 2.9 inches long each. One part of this triple layered catalyst was used as the front zone and another part of 2.9 inches catalyst from Example 4 was used as the rear zone. A similar way of producing the same effect is by coating the third layer at only 50% of the axial length at the inlet portion above the second layer. The washcoat gain of third layer in the front zone or as the whole catalyst is about 20 g.

Example 6

Based on the results of Example 3, further catalysts were prepared, those of Examples 4 and 5, and tested using the Europe standard MVEG test cycles and well known U.S. standard emission test (FTP or EPA-75) (see *Code of Federal Regulations*, Title 40, Section 86). FTP testing comprises a three-stage emission test consisting of a first cold phase or start-up phase, a transient phase and a hot start phase. In general the three-phases involve measuring emissions over a specified period through various modes of engine operation, including idle, acceleration and deceleration. Both catalyst were aged at 100 hours with maximum catalyst bed temperature around 900° C., and the gasoline fuel added with 12 mg/L phosphorous ZDDP.

Examples 5 contained a non-precious metal containing overcoat washcoat layer (poison protection layer) over only the upstream or inlet 50% (~2.8 inches) of the underlying precious metal containing washcoat layer. The results are shown below in Tables 2 and 3.

TABLE 2

| | Catalyst Article | | | |
|---|---|---|---|---|
| | ECE (low speed/flow) | | EUDC (high speed/flow) | |
| | Pollutant (mg/km) | | | |
| | NOx | HC | NOx | HC |
| Example 4 | 111 | 199 | 44 | 6 |
| Example 5 | 79 | 179 | 27 | 6 |

TABLE 3

| | Catalyst Article | | | | | | | |
|---|---|---|---|---|---|---|---|---|
| | FTP Total | | Phase 1 | | Phase 2 | | Phase 3 | |
| | Pollutant (mg/km) | | | | | | | |
| | NOx | HC | NOx | HC | NOx | HC | NOx | HC |
| Example 4 | 104 | 54 | 54 | 34 | 22 | 8 | 28 | 12 |
| Example 5 | 81 | 44 | 50 | 29 | 13 | 6 | 18 | 9 |

From Tables 2 and 3 it is apparent that there is an increase in catalyst efficiency as a result of using a non-precious metal containing overcoat layer over the upstream or inlet 50% of the substrate carrier. Since the rear 50% of the axial length was not coated with an overcoat, the effectiveness of Rh and OSC top layer was maintained for hot performance requirements such as in EUDC of MVEG, and Phase-2 and -3 durations of FTP cycles.

Example 7

To elucidate phosphorous deposition across the axial length and to optimize poison-capture zone length, four different sample washcoats were prepared and phosphorous axial measured after engine aging (maximum catalyst bed temperature ~1000° C.) with 12 mg/L P added fuel for 34 hours for each sample washcoat.

Sample 7-1 was a two-layer coating formulation containing a total washcoat loading of 3.16 g/in$^3$ and 60 g/ft$^3$ of precious metals. The first washcoat layer was formed by applying aqueous media of ~41% solid content to a substrate surface. The aqueous media contained 25.2 g of palladium impregnated as palladium nitrate solution by a Planetary mixer into 1207.6 g γ-alumina, 161 g lanthania, 74.1 g nickel oxide and 32.2 g zirconia binder. The coated substrate was then calcined at 530° C. for 2 hours. The second layer was formed by applying aqueous media of ~37% solid content to the surface of the first layer. The ~37% aqueous media contained 5.3 g of rhodium impregnated as rhodium nitrate solution by Planetary mixer into 532.9 g lanthania-stabilized γ-alumina, 1370.4 g ceria/zirconia composites with 30% ceria and 91.4 g zirconia binder. The two-layer coated substrate was then calcined at 430° C. for 2 hours.

Sample 7-2 was a two-layer coating formulation containing a total washcoat loading of 3.63 g/in$^3$ and 30 g/ft$^3$ of precious metals. The first layer was formed by applying aqueous media of ~38% solid content to a substrate surface. The aqueous media contained 18.2 g of palladium impregnated as palladium nitrate solution by a Planetary mixer into a combination of 235.6 g γ-alumina and 392.6 g ceria/zirconia composites with 20% ceria. The aqueous media also contained 104.7 g ceria, 145.4 g neodymia, 145.4 g lanthania, 53.5 g nickel oxide and 104.7 g zirconia binder. The coated substrate was then calcined at 530° C. for 2 hours. After calcination, the second layer was formed by applying aqueous media of ~37% solid content to the surface of the first layer. The ~37% aqueous media contained 2.2 g rhodium impregnated as rhodium nitrate solution by a Planetary mixer into 383.7 g lanthania-stabilized γ-alumina, 575.5 g ceria/zirconia composites with 30% ceria and 38.4 g zirconia binder. The two-layer coated substrate was then calcined at 430° C. for 2 hours.

Sample 7-3 was a three-layer coating formulation containing a total washcoat loading of 4.59 g/in$^3$ and 30 g/ft$^3$ of precious metals. The first washcoat layer was formed by applying aqueous media of ~35% solid content to a substrate surface. The aqueous media contained 121.8 g γ-alumina, 243.5 g ceria/zirconia composites with 35% ceria, 37.3 g nickel oxide and 24.4 g zirconia binder. The first layer was then coated with the two-layer washcoat formulation of Sample 2 and the substrate was calcined at 430° C. for 2 hours.

Sample 7-4 was a single layer coating formulation containing a total washcoat loading of 2.38 g/in$^3$ and 30 g/ft$^3$ of precious metals. The single washcoat layer was formed by applying aqueous media of ~42% solid content to a substrate surface. The aqueous media contained 8.21 g of palladium and 0.92 g of rhodium impregnated separately as nitrate solution by a Planetary mixer into 210 g lanthania-stabilized γ-alumina, 288.6 g ceria/zirconia composites with 20% ceria, 52.5 g lanthania, 24.1 g nickel oxide and 15.5 g zirconia binder. The coated substrate was then calcined at 530° C. for 2 hours.

Phosphorous deposition across the axial length of the substrate for Samples 1, 2, 3 and 4 were measured and the results shown below in Table 4.

rhodium impregnated separately as nitrate solution by a Planetary mixer into 210 g γ-alumina, 341.1 g ceria/zirconia composites with 30% ceria, 24.1 g nickel oxide and 15.7 g zirconia binder. The coated substrate was then calcined at 530° C. for 2 hours.

Phosphorous deposition was measured at various depths into the washcoat after engine aging (maximum catalyst bed temperature ~1000° C.) with 12 mg/L P added fuel for 34 hours for each sample washcoat. The results of phosphorous analysis (as % of P) are shown below in Table 5.

TABLE 5

| | Axial Distance from Inlet | | | |
|---|---|---|---|---|
| WC Depth (μm) | ¼" | ¾" | 1¼" | 2¾" |
| 0 | 0.009 | 0.009 | 0.008 | 0.001 |
| 3 | 0.064 | 0.122 | 0.009 | 0 |
| 6 | 0.893 | 1.565 | 0.107 | 0.124 |
| 9 | 12.652 | 6.329 | 0.78 | 1.522 |
| 12 | 6.842 | 7.773 | 3.279 | 0.708 |
| 15 | 3.592 | 6.582 | 2.489 | 0 |
| 18 | 3.086 | 2.933 | 2.245 | 0 |
| 21 | 2.463 | 2.092 | 1.873 | 0 |
| 24 | 2.441 | 2.304 | 1.366 | 0 |
| 27 | 2.034 | 1.837 | 0.793 | 0 |
| 30 | 1.538 | 1.564 | 0.132 | 0 |
| 33 | 0.89 | 1.532 | 0 | 0 |
| 36 | 0.136 | 1.131 | 0 | 0 |
| 39 | 0 | 0.155 | 0 | 0 |
| 42 | 0 | 0 | 0 | 0 |

From Table 5 it was found that the majority of deposited phosphorous was detected at depths of less than 40 μm into the washcoat layer. Therefore, combining observations from Examples 7 and 8, it would be advantageous to design a poison-trapping layer that is sufficiently long (in axial length

TABLE 4

| Catalyst Article | | | P$_2$O$_2$ (mg/in$^3$) at various axial | | | | | |
|---|---|---|---|---|---|---|---|---|
| | # of | WC | lengths from the inlet | | | | | |
| Sample | Coats | (g/in$^3$) | 0-0.5" | 0.5-1.0" | 1.0-1.5" | 1.5-2.0" | 2.0-2.5" | 2.5-3.0" |
| 7-1 | 2 | 3.16 | 490 | 214 | 108 | 59 | 27 | 15 |
| 7-2 | 2 | 3.63 | 402 | 254 | 135 | 79 | 43 | 23 |
| 7-3 | 3 | 4.59 | 350 | 216 | 133 | 79 | 46 | 32 |
| 7-4 | 1 | 2.38 | 381 | 234 | 124 | 74 | 38 | 22 |

It was observed that phosphorous was deposited on the catalyst mostly in the inlet 2.5 inches. A phosphorous gradient was detected from about ~400 mg/in3 to about 80 mg/in$^3$ (20% of inlet) in the inlet 1.5" axial location. Also, the high phosphorous distribution in the upstream or inlet portion of the substrate was seen regardless of the use of single, double, or triple washcoat layers, of precious metal loading or of washcoat loading.

Example 8

To further understand the depth of phosphorous deposition into washcoat, a single-washcoat layer was prepared containing a total washcoat loading of 2.38 g/in$^3$ and 30 g/ft$^3$ of precious metals.

The single washcoat layer was formed by applying aqueous media of ~42% solid content to a substrate surface. The aqueous media contained 8.21 g of palladium and 0.92 g of from the inlet) and deep (in radial washcoat thickness) to keep poisons from damaging catalytic layers, while not creating an excessive diffusional barrier to retard mass transfer and consequently warm-up activity.

Example 9

The front zone of Example 5 was analyzed for poison trapping efficiency after prolonged 100 hour engine aging with gasoline fuel doped with 12 mg/L phosphorous as ZDDP. It was confirmed by EPMA (Electron Microprobe) that the third layer coating was approximately 42 μm, and it trapped approximately 74% of P, 83% of Ca, and 76% Zn in the inlet region (see Table 6). Therefore, the Rh/OSC (ceria) containing second layer was protected from the majority of the poisons. At a depth of 84 μm it was shown that approximately 95% of P, 84% of Ca, and 83% of Zn were trapped (see Table 6). At a depth of approximately 102 μm it was shown that approximately 99% of P, 84% of Ca, and 92% of Zn were trapped (see Table 6).

TABLE 6

| Depth | Element | | | | |
|---|---|---|---|---|---|
| | Al | P | Ca | Zn | Ce |
| 1<sup>st</sup> 42 μm | 9.4% | 73.9% | 82.9% | 75.7% | 11.9% |
| 42 to 84 μm | 3.0% | 21.9% | 1.1% | 8.1% | 84.9% |
| 84 to 102 μm | 12.5% | 3.6% | 0.6% | 8.8% | 1.5% |
| 102 to 170 μm | 75.0% | 0.6% | 15.4% | 7.4% | 1.6% |
| 1 to 102 μm | 25.0% | 99.4% | 84.6% | 92.6% | 98.4% |

What is claimed is:

1. An automobile exhaust gas treatment catalyst consisting of:
   (a) a substrate coated with at least two washcoat layers containing one or more precious metal components, wherein at least one washcoat layer optionally comprises an oxygen storage component; and
   (b) an overcoat layer comprising a porous refractory oxide, and one or more base metal oxides, wherein when said base metal oxide is lanthanum oxide said lanthanum oxide is present in an amount of no more than 0.2 g/in$^3$ and wherein said overcoat layer is devoid of precious metals and optionally comprises an oxygen storage component,
   and wherein either:
   i) said at least two washcoat layers containing one or more precious metal components are contiguous to one another and are coated with said overcoat layer, or
   ii) said overcoat layer is placed between a pair of the at least two washcoat layers containing one or more precious metal components, said pair of washcoat layers comprising a bottom washcoat layer and a top washcoat layer and wherein said overcoat layer is coated over said bottom washcoat layer.

2. The automobile exhaust gas treatment catalyst of claim 1, wherein said base metal oxide is selected from the group consisting of alkali metal oxides, alkaline earth metal oxides, transition metal oxides and rare earth metal oxides.

3. The automobile exhaust gas treatment catalyst of claim 1, wherein said substrate is a honeycomb monolith.

4. The automobile exhaust gas treatment catalyst of 1, wherein said porous refractory oxide is alumina.

5. The automobile exhaust gas treatment catalyst of claim 1, wherein at least one of said washcoat layers further comprises an oxygen storage component.

6. The automobile exhaust gas treatment catalyst of claim 1, wherein said overcoat layer is coated over an upstream portion of said catalyst from an upstream edge of said catalyst, thereby creating a poison capture zone, and wherein said poison capture zone comprises a length ranging from 10 to 60% of the length of said catalyst from said upstream edge.

7. The automobile exhaust gas treatment catalyst of claim 1, wherein said overcoat layer is coated over an upstream portion of said catalyst from an upstream edge of said catalyst, thereby creating a poison capture zone, and wherein said poison capture zone comprises a length ranging from 1 to 5 inches of the length of said catalyst from said upstream edge.

8. The automobile exhaust gas treatment catalyst of claim 1, wherein said top washcoat layer is coated over a downstream portion of said substrate, thereby creating an upstream poison capture zone which is not coated by said top washcoat layer.

9. The automobile exhaust gas treatment catalyst of claim 1, wherein said overcoat layer is from 10 microns to 120 microns thick.

10. The automobile exhaust gas treatment catalyst of claim 1, wherein said porous refractory oxide contains intra- and/or inter-particle pore, wherein said pore has a radius size ranging in size from about 10 to about 500 angstroms.

11. The automobile exhaust gas treatment catalyst of claim 1, wherein said overcoat layer further comprises an oxygen storage component.

12. The automobile exhaust gas treatment catalyst of claim 11, wherein said overcoat layer further comprises additional components, selected from the group consisting of compounds containing yttrium, niobium, lanthanum, praseodymium, neodymium, promethium, samarium, dysprosium and ytterbium.

13. The automobile exhaust gas treatment catalyst of claim 1, wherein said base metal oxide is an alkaline earth metal oxide selected from the group consisting of barium oxide, strontium oxide, magnesium oxide and calcium oxide.

14. The automobile exhaust gas treatment catalyst of claim 13, wherein said alkaline earth metal oxide is selected from the group consisting of barium oxide and strontium oxide.

15. A method of treating an automobile exhaust gas comprising contacting an exhaust gas stream with an automobile exhaust gas treatment catalyst, said catalyst having increased resistance to poisoning from oil- and/or fuel-derived additives, and wherein said catalyst comprises a substrate having an upstream edge in initial contact with said exhaust gas and a downstream edge, wherein said catalyst consists of:
   (a) at least two washcoat layers containing one or more precious metal components coated on said substrate, wherein at least one washcoat layer optionally comprises an oxygen storage component; and
   (b) an overcoat layer comprising a porous refractory oxide, one or more base metal oxides, wherein if said base metal oxide is lanthanum oxide said lanthanum oxide is present in amounts of no more than 0.2 g/in$^3$ and wherein said overcoat layer is devoice of precious metals and optionally comprises an oxygen storage component,
   and wherein either:
   i) said at least two washcoat layers containing one or more precious metal components are contiguous to one another and are coated with said overcoat layer, or
   ii) said overcoat layer is placed between a pair of the at least two washcoat layers containing one or more precious metal components, said pair of washcoat layers comprising a bottom washcoat layer and a top washcoat layer and wherein said overcoat layer is coated over said bottom washcoat layer; and
   (c) passing said exhaust gas over said catalytic member from said upstream edge to said downstream edge.

16. The method of claim 15, wherein said substrate is a honeycomb monolith.

17. The method of claim 15, wherein at least one of said washcoat layers further comprises an oxygen storage component selected from the group consisting of ceria, a mixed oxide of cerium and zirconium and a mixed oxide of cerium, zirconium, praseodymium, neodymium, and/or lanthanum.

18. The method of claim 15, wherein said porous refractory oxide is alumina.

19. The method of claim 15, wherein said overcoat layer further comprises an oxygen storage component.

* * * * *